INVENTOR.
ELLWOOD F. RIESING

United States Patent Office 2,736,585
Patented Feb. 28, 1956

2,736,585

FLUID SEAL

Ellwood F. Riesing, Dayton, Ohio, assignor to General Motors Corporation, Detroit, Mich., a corporation of Delaware Application December 5, 1952, Serial No. 324,328

2 Claims. (Cl. 288—3)

This invention relates to fluid seals and is particularly concerned with fluid seals of the radial type.

It is therefore one of the main objects of the invention to provide a fluid seal of the radial type which has greater flexibility from an installation standpoint and wherein the sealing efficiency is improved through the use of a separate seal ring.

In carrying out the above object, it is a further object to provide a fluid seal of the radial type wherein the usual diaphragm design is used preferably including a garter spring around the sealing lip portion thereof and wherein the sealing lip portion is recessed peripherally to receive a sealing ring made from a different material than the remainder of the seal.

Another object of the invention is to provide an improved seal ring for use with radial type seals preferably made from such synthetic materials, such as, Teflon, nylon, silicon, resins and the like.

Another object of the invention is to provide a radial type seal which includes a keeper ring thereon, which keeper ring is preferably of spring wire snapped into a groove on the sealing lip portion thereof to prevent expansion of the sealing lip due to high pressures of the sealed fluid.

Still another object of the invention is to utilize a sealing ring, such as a Teflon sealing ring, wherein the outer periphery thereof is serrated or saw-toothed so as to prevent relative rotation between the ring and the radial retainer which carries the ring.

Further objects and advantages of the present invention will be apparent from the following description, reference being had to the accompanying drawings, wherein preferred embodiments of the present invention are clearly shown.

In applications, Serial Nos. 324,324, 324,325, 324,326, 324,327, all filed concurrently herewith, various types of radial seals are disclosed and in these applications, the specific advantages of the different designs are clearly set forth.

This application is directed to a radial type seal which incorporates an improved sealing portion therein embodied in a seal ring made separate from the remainder of the seal and capable of replacement as desired.

Radial seals as usually manufactured have a tendency to age-harden adjacent the sealing lip due to the chemical action within the elastomeric material used. This condition is hastened by heat emanating from the relatively high coefficient of friction between the usual elastomeric sealing lip and the movable element being sealed. In this manner, the seal loses some of its efficiency after long periods of use. Further, such seals are subjected to wear and when high pressure sealing applications are encountered, these seals sometimes fail due to the extreme pressures involved. The present design eliminates all of these past problems and thereby produces a radial type seal with greater flexibility in that the seal may be used throughout a wider variety of applications.

This is explained by the fact that the seal, due to certain improvements embodied therein as will be disclosed hereinafter, is particularly applicable to high pressure applications and likewise due to the use of a separate sealing ring of a harder, more wear resistant material than the remainder of the seal, the sealing efficiency thereof is maintained over long periods of time wherein the sealing ring is not subject to age-hardening and similar conditions usually inherent to elastomeric materials, such as natural rubber, butadiene-acrylonitrile copolymers, butadiene-styrene copolymers, polychloroprene and similar conventional compounds.

Figure 1:
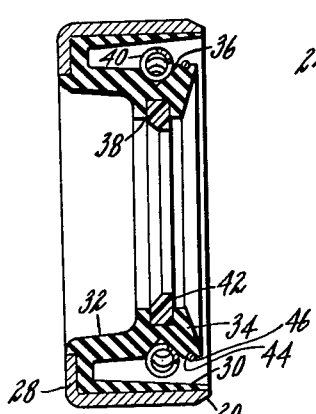
Fig. 1 shows one type of a radial seal in section.

Referring particularly to the drawings, one type of seal is shown at 20 in Fig. 1. A portion of the seal is shown in enlarged form in Fig. 2 wherein the seal 20 is installed in a cavity 22 within a housing member 24 and is sealingly engaged with a shaft 26 journaled in said housing 24. The seal 20, in this instance, includes a metal retaining cup 28 to which is bonded an elastomeric compound 30 at the internal surface of the cup. The elastomeric portion of the seal 20 includes a peripheral diaphragm 32 connected to a sealing portion 34 that includes a pair of grooves 36 and 38 therein. These grooves 36 and 38 are peripherally disposed and the groove 36 is of substantially triangular cross section so as to receive a garter spring 40. The groove 38 is adapted to receive a sealing ring 42 to be described in more detail hereinafter. The groove 38 is preferably a snug fit on the ring 42.

It will be noted that the sealing portion 34 of the seal 20 is spaced from the surface of the shaft and this space is taken up by the seal ring 42.

Seal ring 42 forms a very basic part of the invention in that this seal ring is fabricated from a different material than the remainder of the seal 20. The seal ring 42 is preferably formed from such synthetic materials as Teflon (tetrafluoroethylene), nylon (polyamides) or silicone resins. These materials are well known as being tough and wear resistant and have excellent bearing properties with relatively low coefficient of friction. Teflon is one of the preferred materials in that it has a greasy or waxy feel which acts in a lubricating manner against the shaft 26 being sealed. All of these materials have a degree of resiliency and when the seal ring 42 is in place, the garter spring 40 tends to compress it more tightly against the shaft, although the seal should be a snug sliding fit on the shaft for either reciprocal or rotational movement thereof. The garter spring 40 has the additional function of holding the elastomeric portion 34 of the seal 20 in tight sealing contact with the ring 42. In high pressure applications of seals of the type shown at 20 in Fig. 2, an additional small groove 44 may be provided in the portion 34 into which a spring wire keeper ring 46 may be snapped. The ring 46 prevents the portion 34 from being expanded outwardly due to excessive pressures and thereby keeps the seal in operative condition. The use of the keeper ring 46 is optional and depends upon the type of application in which the seal is being used.

Figure 2:
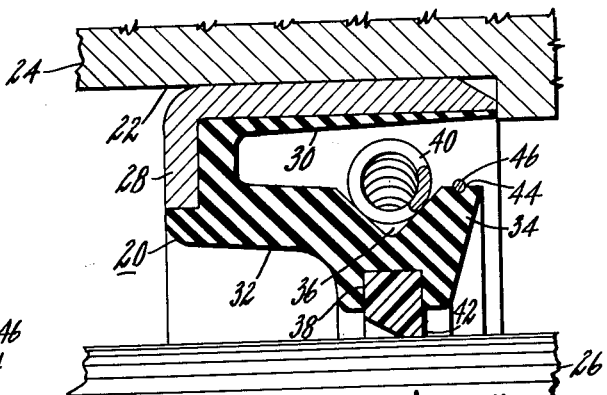
Fig. 2 is an enlarged section of one half of the seal shown in Fig. 1, in position between a housing and shaft.
Figure 3:
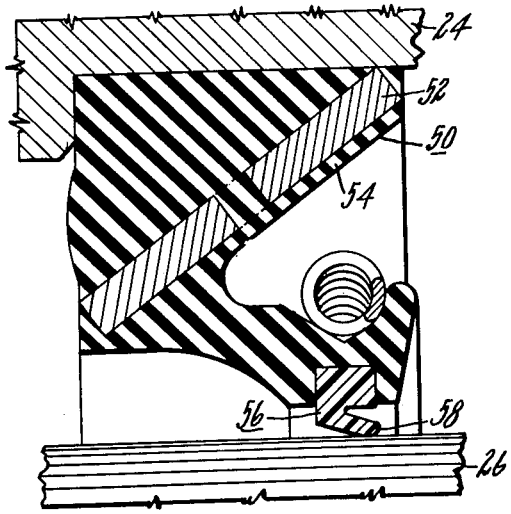
Fig. 3 is a view similar to Fig. 2 showing a different type of seal design.

Fig 3 shows another type of seal at 50. This seal includes a truncated conical reinforcing ring 52 therein which may be apertured circumferentially thereof to permit free flow therethrough of elastomeric material 54 during the molding of the seal. This type of seal may be used in numerous applications where metallic retaining cups as shown in Fig. 2 are not necessary or desired. A seal ring 56, in this instance, similar to the ring 42 shown in Fig. 2, includes an outwardly extending flexible lip 58 thereon. This type of ring gives further adjustability to the unit and may be used where desired.

Figure 4:
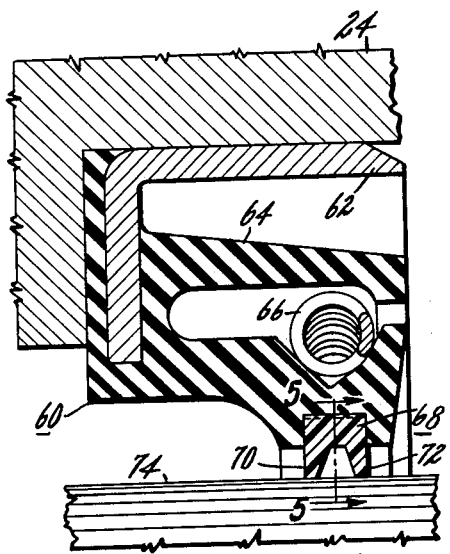
Fig. 4 is a view similar to Fig. 2 showing still another design of seal.
Figure 5:
Fig. 5 is a fragmentary sectional view taken on line 5—5 of Fig. 4 showing serrated outer periphery of the seal ring.

Fig. 4 shows still another type of seal at 60. In this instance, a metallic retaining cup 62 is used and the seal differs from that shown in Fig. 2 by the inclusion of a guard lip or flange 64 which tends to maintain the garter spring 66 in position and also prevents free ingress of dirt or mud into the garter spring groove. Another type of seal ring 68 is shown in this embodiment wherein two lips 70 and 72 are provided to sealingly engage a shaft 74. This type of seal ring is interchangeable with those shown in Fig. 2 at 42 and Fig. 3 at 56 and in all cases, the seal ring best adapted for the application should be chosen.

In some instances, the sealing ring, being of a harder material than the material in the main body of the seal, has a tendency upon wear or changes in temperature to rotate relative to the seal ring retainer when the seal is being used to seal a rotating shaft from a housing. Obviously, if the shaft is reciprocating in nature, this problem does not arise. In order to eliminate relative rotation between the seal ring 68 and the main body of the seal, the outer periphery of the ring 68 may be serrated as at 76 to include saw teeth around the periphery thereof which bite into the elastomeric material of the retainer and are held in tight engagement therewith through the action of the garter spring. Any other type of suitable interlock may be used on either the side faces or outer periphery as desired. In this manner, the seal ring 68 is prevented from rotating relative to the seal.

It should be understood that while the sealing ring as discussed herein, is preferably formed from such materials as Teflon, nylon or silicon resins, it may be formed from other materials which are preferably of a different hardness than the body of the seal and which have at least equal wear resistance to the material of the seal.

It is apparent in the seal applications discussed herein that when the seal rings become worn or damaged, they may be replaced without the necessity of replacing the entire seal. Likewise, if the shaft is replaced, due to injury thereof, a new seal ring may be included in the seal for providing efficient sealing effect in differentiation to the usual type of axial seal wherein the sealing lip becomes worn necessitating replacement of the entire unit. Further, it is apparent that the same seal may be used with different seal rings when using varying diameter shafts. In other words, an oversize or undersize shaft may be inserted in the housing and the proper diameter seal ring may be used in connection with the radial type seal whereby the flexibility of application is markedly increased since a plurality of varying sizes of seal rings may be handled with a single radial seal for efficiently sealing a plurality of different sized shafts. In this connection it is apparent that if the shaft size varies markedly, different seals must be used since the clearance between the seal and the shaft cannot be of any great magnitude and is preferably maintained not to exceed in the order of $3/16''$.

While the embodiments of the present invention as herein disclosed, constitute preferred forms, it is to be understood that other forms might be adopted.

What is claimed is as follows:

1. A fluid seal of the radial type adapted to seal a shaft rotatably journaled in a housing, comprising in combination; an elastomeric body portion adapted to sealingly engage the housing, a first elastomeric sealing lip having a diameter greater than the diameter of the shaft and encircling said shaft, said first lip having a circumferential groove therein facing said shaft, an elastomeric diaphragm portion connecting said body and said first sealing lip and integrally formed therewith, a sealing ring adapted to be immovably carried in said groove and including an inwardly extending resilient flexible lip portion having an inner diameter dimensioned so that the last-mentioned lip portion slidably and sealingly engages said shaft and a garter spring disposed about said first sealing lip in substantial radial alignment with said sealing ring whereby said sealing ring is urged into sealing engagement with said shaft.

2. The fluid seal of the radial type adapted to seal a shaft rotatably journaled in a housing, comprising in combination; an elastomeric body portion adapted to sealingly engage the housing, a first elastomeric sealing lip having a diameter greater than the diameter of the shaft and encircling said shaft, said first lip having a circumferential groove therein facing said shaft, an elastomeric diaphragm portion connecting said body and said first sealing lip and integrally formed therewith, a sealing ring adapted to be immovably carried in said groove and including an inwardly extending resilient flexible lip portion having an inner diameter dimensioned so that the last-mentioned lip portion slidably and sealingly engages said shaft, said sealing ring having interlocking portions adjacent its outer periphery adapted to cooperate with portions of the bottom wall of said groove for positively preventing relative rotation between said sealing ring and said first sealing lip and a garter spring disposed about said first sealing lip whereby said sealing ring is urged into interlocking relation with said first sealng lip and in sealing engagement with said shaft.

References Cited in the file of this patent

UNITED STATES PATENTS

| | | |
|---|---|---|
| 2,181,203 | Reynolds | Nov. 28, 1939 |
| 2,387,182 | Procter | Oct. 16, 1945 |
| 2,467,312 | Jack | Apr. 12, 1949 |
| 2,565,190 | Winkeljohn | Aug. 21, 1951 |
| 2,599,149 | Allen | June 3, 1952 |
| 2,626,839 | Creson et al. | Jan. 27, 1953 |
| 2,651,534 | Kosatka | Sept. 8, 1953 |

FOREIGN PATENTS

| | | |
|---|---|---|
| 556,441 | Great Britain | Oct. 5, 1943 |
| 959,431 | France | Sept. 26, 1949 |